(12) United States Patent
De'Longhi et al.

(10) Patent No.: US 10,709,285 B2
(45) Date of Patent: Jul. 14, 2020

(54) DOUBLE-WALLED FILTER FOR COFFEE MACHINE WITH IMPROVED DISPENSING

(71) Applicant: DE'LONGHI APPLIANCES SRL, Treviso (IT)

(72) Inventors: Giuseppe De'Longhi, Treviso (IT); Luciano Scian, Treviso (IT); Massimo Poggioli, Treviso (IT)

(73) Assignee: DE'LONGHI APPLIANCES SRL, Treviso (IT)

( * ) Notice: Subject to any disclaimer, the term of this patent is extended or adjusted under 35 U.S.C. 154(b) by 0 days.

(21) Appl. No.: 16/084,750

(22) PCT Filed: Mar. 17, 2017

(86) PCT No.: PCT/IB2017/051560
§ 371 (c)(1),
(2) Date: Sep. 13, 2018

(87) PCT Pub. No.: WO2017/158565
PCT Pub. Date: Sep. 21, 2017

(65) Prior Publication Data
US 2019/0069709 A1    Mar. 7, 2019

(30) Foreign Application Priority Data
Mar. 17, 2016    (IT) .................. 102016000028310

(51) Int. Cl.
*A47J 31/06*    (2006.01)
(52) U.S. Cl.
CPC .................. *A47J 31/0663* (2013.01)

(58) Field of Classification Search
CPC .................................................. A47J 31/0663
(Continued)

(56) References Cited

U.S. PATENT DOCUMENTS 4,231,876 A    11/1980    Zimmermann et al.
4,255,265 A  *  3/1981    Greutert .............. A47J 31/0621
                                                210/474
(Continued)

FOREIGN PATENT DOCUMENTS

CA    2181246 A1    9/1995
CN    1 293 019 A    5/2001
(Continued)

OTHER PUBLICATIONS

International Search Report with Written Opinion of the International Searching Authority, dated Jun. 7, 2017, with respect to International Application No. PCT/IB2017/051559—cited only for references that are disclosed therein.
(Continued)

*Primary Examiner* — Madeline Gonzalez
(74) *Attorney, Agent, or Firm* — Scott R. Cox

(57) ABSTRACT

A double-walled filter for a coffee machine with improved dispensing including a cup-shaped body for containing coffee powder, having at least a bottom wall having an opening; a filtering wall placed in the cup-shaped body upstream of the opening and removably associated with the cup-shaped body; a seal placed at least between one edge of the filtering wall and the cup-shaped body, wherein said seal is placed on said bottom wall and has a dispensing hole for dispensing a beverage at said opening.

14 Claims, 1 Drawing Sheet

(58) Field of Classification Search
USPC ........ 210/483, 471, 473, 474, 477, 481, 464
See application file for complete search history.

(56) References Cited

U.S. PATENT DOCUMENTS

| | | | |
|---|---|---|---|
| 5,150,645 A * | 9/1992 | Schiettecatte | A47J 31/0663 99/295 |
| 6,012,379 A | 1/2000 | Matuschek | |
| 8,667,890 B2 | 3/2014 | Macchi | |
| 8,808,777 B2 | 8/2014 | Kamerbeek et al. | |
| 8,906,435 B2 | 12/2014 | Kamerbeek et al. | |
| 9,271,601 B2 | 3/2016 | Kamerbeek et al. | |
| 9,604,776 B2 | 3/2017 | Kamerbeek et al. | |
| 9,656,798 B2 | 5/2017 | Kamerbeek et al. | |
| 10,392,184 B2 | 8/2019 | Kamerbeek et al. | |
| 2007/0028783 A1 | 2/2007 | Chen et al. | |
| 2016/0106254 A1 | 4/2016 | Eyrignoux | |

FOREIGN PATENT DOCUMENTS

| | | |
|---|---|---|
| CN | 1 012 141 24 A | 7/2008 |
| CN | 2016/58242 U | 12/2010 |
| DE | 7435607 U | 2/1975 |
| DE | 19620381 A1 | 1/1997 |
| DE | 202015103015 U1 | 6/2015 |
| EP | 0682902 A1 | 11/1995 |
| EP | 0861679 A1 | 9/1998 |
| EP | 1749463 A1 | 2/2007 |
| EP | 2 805 651 A1 | 11/2014 |
| FR | 1255021 A | 3/1961 |
| WO | 02/091889 A2 | 11/2002 |
| WO | 2007/036078 A1 | 4/2007 |
| WO | 2007080258 A2 | 7/2007 |
| WO | 2011/097866 A1 | 8/2011 |

OTHER PUBLICATIONS

International Preliminary Report on Patentability of the International Searching Authority, dated Sep. 18, 2018, with respect to International Application No. PCT/IB2017/051559—cited only for references that are disclosed therein.
European Search Report issued by Italian Patent Office dated Dec. 14, 2016 with respect to ITUA20161785—cited only for references that are disclosed therein.
International Search Report with Written Opinion of the International Searching Authority, dated Jun. 30, 2017, with respect to International Application No. PCT/IB2017/051560—cited only for references that are disclosed therein.
International Preliminary Report on Patentability of the International Searching Authority, dated Sep. 18, 2018, with respect to International Application No. PCT/IB2017/051560—cited only for references that are disclosed therein.
European Search Report issued by Italian Patent Office dated Dec. 2, 2016 with respect to ITUA20161788—cited only for references that are disclosed therein.
International Search Report with Written Opinion of the International Searching Authority, dated Jul. 4, 2017, with respect to International Application No. PCT/IB2017/051557—cited only for references that are disclosed therein.
International Preliminary Report on Patentability of the International Searching Authority, dated Sep. 18, 2018, with respect to International Application No. PCT/IB2017/051557—cited only for references that are disclosed therein.
European Search Report issued by Italian Patent Office dated Dec. 19, 2016 with respect to ITUA20161783—cited only for references that are disclosed therein.
English Translation of Official Action with Search Report issued by Chinese Patent Office dated Mar. 30, 2020 with respect to parallel Chinese Patent Application No. 201780022945.5.
English Translation of Official Action with Search Report issued by Chinese Patent Office dated Apr. 9, 2020 with respect to Chinese Patent Application No. 201780024276.5—parallel application in relation to potentially related U.S. Appl. No. 16/084,742.

* cited by examiner

DOUBLE-WALLED FILTER FOR COFFEE MACHINE WITH IMPROVED DISPENSING

The present invention concerns a filter for a coffee machine. In particular, the present invention can be applied in the so-called double walled filters.

In fact, filters are known comprising a cup-shaped body having a bottom wall and a substantially cylindrical lateral wall connected to the bottom wall. A compartment is defined in the cup-shaped body for the coffee powder.

The filter is intended to be inserted in a filter holder that is coupled to the coffee machine for making the beverage.

A dispensing hole is provided in the bottom wall for the infused coffee to exit. A filtering wall is arranged within the cup-shaped body compartment. The filtering wall is substantially flat and has a multitude of through holes that allow the infused coffee to pass and retain the coffee powder in the compartment.

Filters are known in which the filtering wall is non-removably fixed to the cup-shaped body. This can determine a rapid decline in the functionality of the filter as impurities and encrustations can form in the gap between the bottom wall and the filtering wall.

To prevent this phenomenon, in other embodiments, the filtering wall is removably coupled to the cup-shaped body so as to be able to remove it and to be able to clean the gap.

A seal may be placed between the filtering wall and the cup-shaped body to prevent the coffee powder passing into the gap and through the exit hole.

Disadvantageously, filters of the known type are not able to guarantee constant efficiency. With reference to cleaning the cup-shaped body, particular attention must be paid to cleaning the dispensing hole. In fact, it must always be kept completely free to allow the correct passage of the beverage exiting the filter.

In consideration of the small size of the dispensing hole, its cleaning may be complex and it may be necessary to resort to mechanical tools for freeing the hole from encrustations. Over time, the cleaning operations may become progressively more demanding and can even cause damage to the dispensing hole, with a consequent loss of functionality of the filter.

Furthermore, in some known solutions, described for example in WO 02/091889_A2, the cleaning of the dispensing passages is made difficult due to their inaccessibility and the high number of components of which the filter is comprised.

An object of the present invention is to propose a filter for a coffee machine that avoids the described drawbacks. In particular, it is an object of the present invention to propose a filter for a coffee machine distinguished by long-lasting effectiveness over time.

The object of the present invention is reached by a filter for coffee machines comprising the characteristics of one or more of the appended claims.

In accordance with the present invention, a filter for a coffee machine comprises a cup-shaped body for containing coffee powder, having at least a bottom wall that has an opening; a filtering wall placed in the cup-shaped body upstream of the opening and removably associated with the cup-shaped body; a seal placed at least between one edge of the filtering wall and the cup-shaped body; the seal is placed on said bottom wall and has a dispensing hole for dispensing a beverage at said opening.

This solution allows the filter cleaning and maintenance operations to be simplified. In fact, on one hand it allows all the parts of the filter to be easily separated and disassembled, making them washable in a short time, and on the other the removal of encrustations at the dispensing hole may also be effectively made with energetic mechanical actions without the risk of damaging the hole since the seal can be separated both from the cup-shaped body and from the filtering wall. Such actions can also be performed with suitable tools for freeing the hole from encrustations or elements that obstruct it.

Preferably, the seal is made of elastomeric material making it deformable and allowing such actions without the risk of damaging the hole. Even more preferably, the elastomeric material is based on food grade silicone.

Further, advantageously, even if the dispensing hole is damaged and its functionality compromised, it could be restored simply by replacing the seal. In that way, there would be a new and fully functional dispensing hole, leaving the functionality of the filter unaltered, without the need for fully replacing the filter. Finally, the solution described allows simple disassembly and reassembly of the filter which can be quickly separated into all its components for being effectively cleaned.

It is to be noted, within the scope of the present description, that the term "opening" means an opening with dimensions such as not to allow a sensitive acceleration of the beverage flow exiting the filter through the opening itself. On the other hand, the term "dispensing hole" means a passage of clearly smaller dimensions than those of the opening and such as to determine a notable acceleration to the flow of beverage in transit.

Furthermore, such acceleration is at the origin of the high flow turbulence which causes a marked mixing of air with the consequent formation of a coffee cream or froth.

According to a further aspect of the invention, the seal is substantially bowl shaped. Such characteristic allows the seal to be stably coupled to the cup-shaped body. Furthermore, in this way, the seal covers the entire bottom wall of the cup-shaped body. Consequently, the bottom wall of the cup-shaped body is not hit by the beverage flow coming from the filtering wall and is therefore not dirtied by the beverage. This, clearly, further simplifies the cleaning operations.

According to a further aspect of the invention, the seal is counter-shaped to the cup-shaped body. This characteristic allows the seal to be correctly positioned with respect to the cup-shaped body, avoiding misalignments that can compromise the seal.

According to a further aspect of the invention, the seal comprises a coupling member housed in the opening for reversibly fixing the seal to the cup-shaped body. This solution allows the seal to be kept stably in position in a reversible way.

It is to be noted that the correct position of the seal with respect to the cup-shaped body is not only determined for the proper seal upon passage of fluid, but also for maintaining the correct positions and orientation of the dispensing hole.

According to a further aspect of the present invention, the coupling member comprises a protrusion that extends from the seal and passes through the opening. This characteristic allows the relative position between the seal and the cup-shaped body to be stably maintained by simply inserting the protrusion into the opening.

Again, according to an aspect of the present invention, the coupling member comprises an undercut portion arranged on the protrusion. Such characteristic allows the protrusion to be kept in its seat with respect to the opening, hence preventing the seal from moving, becoming misaligned from the cup-shaped body.

According to a further aspect of the present invention, the dispensing hole is made along the protrusion. This solution always allows the dispensing hole to be kept correctly aligned with respect to the opening made in the bottom wall of the cup-shaped body.

According to a further aspect of the present invention, the seal is removably coupled to the filtering wall. In this way it is possible to completely separate the components of the filter, allowing careful cleaning of such components.

Within the scope of the present description, reference shall be made to the appended figures in which.

Figure 1:
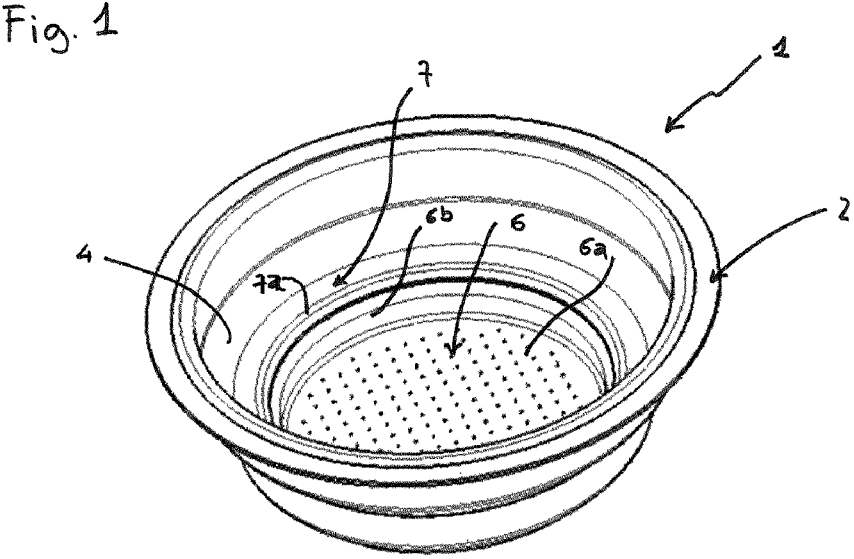
FIG. 1 represents an axonometric view of a filter for coffee machines in accordance with the present invention.
Figure 2:
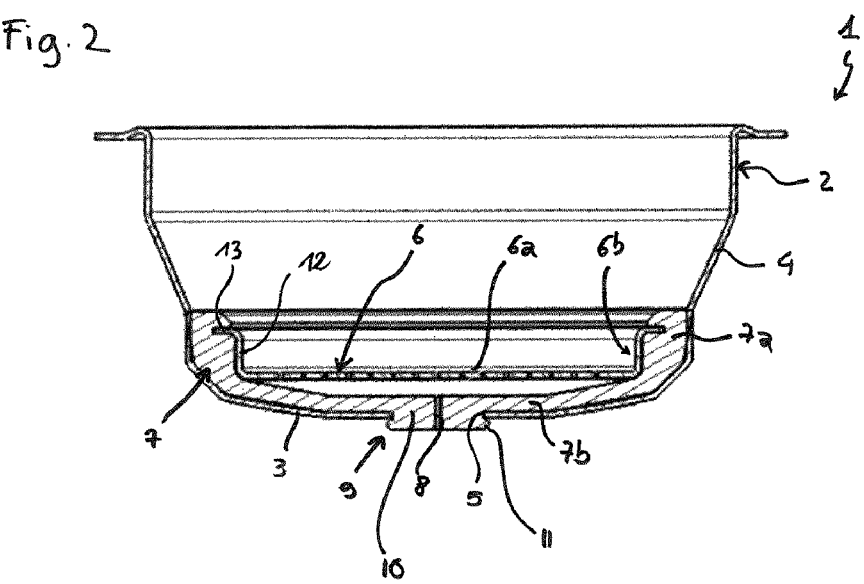
FIG. 2 represents a sectional view of the filter for coffee machines of FIG. 1.

With reference to the appended figures, a filter for coffee machines in accordance with to the present invention is indicated in its entirety by the number 1. The filter 1 comprises a cup-shaped body 2 having a bottom wall 3 and a lateral wall 4 fixed to the bottom wall 3. In the cup-shaped body 2 a compartment is therefore defined for containing a pre-determined dose of coffee powder. As shown, the cup-shaped body 2 has an axisymmetric shape and is made of metal material. The cup-shaped body 2 is, in use, intended to be inserted in a filter holder of a coffee machine.

In the bottom wall 3 of the cup-shaped body 2 an opening 5 is made which allows the beverage to exit the filter 1 in the way that will appear clear below. Purely by way of example, the opening 5 has a diameter comprised between 6 mm and 10 mm, preferably comprised between 7 mm and 9 mm. By way of example, the opening 5 has a diameter substantially equal to 8 mm.

The filter 1 further comprises a filtering wall 6, arranged within the cup-shaped body 2 and placed upstream of the opening 5. As shown, the filtering wall 6 comprises a flat portion 6a, having a multitude of through holes through which the infused beverage passes, retaining the particles of coffee powder. It is to be observed here that the flat shape of the portion 6a of the filtering wall is not a limiting characteristic and may be substituted by a convex or concave curved shape or any other shape. The filtering wall 6 further comprises an edge 6b that extends perimetrally to the flat portion 6a.

The filtering wall 6 is removably associated with the cup-shaped body 2. In more detail, the filtering wall is arranged in the cup-shaped body 2 so that at least the edge 6b is coupled to the cup-shaped body 2. In particular, the edge 6b is preferably coupled to the lateral wall 4. Preferably, the filtering wall 6 is made of metal material, but it is also just as possible for it to be made of plastic material.

The filter 1 further comprises a seal 7 placed between the filtering wall 6 and the cup-shaped body 2. In more detail, the seal 7 is placed at least between the edge 6b of the filtering wall 6 and the cup-shaped body 2. Such seal 7 prevents a flow between the filtering wall 6 and the cup-shaped body 2 which would also cause the passage of coffee powder which would contaminate the beverage. Preferably, the seal 7 is made of elastomeric material, for example, silicone rubber. In detail, the elastomeric material is based on food grade silicone.

It is to be noted that in the step of making the beverage, the filter 1 is crossed by a flow of hot water under pressure. The pressure of the flow of water may reach a value of 9-10 bar and the seal 7 is therefore made in such a way as to withstand such pressure. The filtering wall 6 is fixed removably to the seal 7. They can therefore be mutually separated for simplifying the cleaning of the filter. However, it is also possible to consider fixing the filtering wall 6 in a non-removable way to the seal 7, for example through shape coupling, adhesive means or other mechanical means.

As mentioned, the seal 7 is connected to the filtering wall at the edge 6b. For that purpose, the edge 6b of the filtering wall 6 is L-shaped for making the coupling between the filtering wall 6 and the seal 7. In other words, the edge 6b of the filtering wall 6 comprises a cylindrical wall 12 that extends transversally to the preferably flat portion 6a of the filtering wall 6 along its entire perimeter.

Furthermore, the edge 6b of the filtering wall 6 comprises an annular wall 13, with a circular crown shape, which extends from the cylindrical wall 12 in an opposite position to the portion 6a of the filtering wall 6.

In creating the coupling between the filtering wall 6 and the seal 7, the annular wall 13 is inserted in a corresponding groove made in the seal 7.

In accordance with the present invention, the seal 7 has a shape such as to be superimposed on the bottom wall 3 of the cup-shaped body 2. More in particular, the seal 7 has a shape such as to be completely superimposed on the bottom wall 3 of the cup-shaped body 2. In detail, the seal 7 has an annular portion 7a placed between the edge 6b of the filtering wall 6 and the cup-shaped body 2 and a bowl-shaped portion 7b made as a single piece with the annular portion 7a. Therefore, overall, the seal 7 has a bowl shape.

It is to be observed that the filtering wall 6 is fixed to the cup-shaped body 2 by means of interference coupling through the seal 7 and, in particular, through the annular portion 7a. The coupling groove of the edge 6b of the lateral wall 6 is made in the annular portion 7a of the seal 7.

The seal 7 has a dispensing hole 8 for dispensing a beverage at the opening 5. Through the through hole 8, the beverage downstream of the filtering wall 6 exit the filter 1. Purely by way of example, the hole 8 has a diameter comprised between 0.3 mm and 0.5 mm. By way of example, the hole 8 has a diameter substantially equal to 0.4 mm.

Preferably, the seal 7 is counter-shaped to the cup-shaped body 2 with which it is associated. Advantageously, this allows the risks of incorrect relative positioning between the seal 7 and the cup-shaped body 2 to be minimised or eliminated, guaranteeing the seal of the filter 1.

Furthermore, the seal 7 comprises a coupling member 9 for reversibly fixing the seal 7 to the cup-shaped body 2. The coupling member 9 can be housed in the opening 5. In particular, the coupling member 9 comprises a protrusion 10 that extends from the seal 7 and that passes through the opening 5.

It is to be observed that the protrusion 10 and the opening 5 have a substantially circular shape. Furthermore, the protrusion 10 and the opening 5 substantially have the same diameter. The protrusion 10 is made as a single piece with the seal 7 and is made with the same material.

Furthermore, the coupling member 9 comprises an undercut portion 11 arranged on the protrusion 10 at a free end thereof. In this way, the undercut portion 11 abuts against the bottom wall 3 of the cup-shaped body 2 fixing the seal 7.

The dispensing hole 8 is afforded at the protrusion 10. It is to be observed that the opening 5, the protrusion 10 and the dispensing hole 8 are coaxial to one another and aligned with a central axis of symmetry of the cup-shaped body 2.

The invention thus described reaches the pre-set object.

In fact, as seen, the dispensing hole is made in the seal and therefore in the elastomeric material of which it is made. This characteristic makes the cleaning and encrustation removal operations much simpler.

Since the elastomeric material is elastically deformable, the dispensing hole does not undergo any damage following energetic mechanical actions exerted to remove dirt or encrustations.

Moreover, it should be observed that, if the dispensing hole is damaged and its functionality compromised, it could be restored simply by replacing the seal.

In that way, there would be a new and fully functional dispensing hole, maintaining the functionality of the filter unaltered, without the need for a full replacement thereof.

The invention claimed is:

1. A filter for a coffee machine comprising a cup-shaped body for containing coffee powder, comprising at least a bottom wall comprising an opening; a filtering wall placed in the cup-shaped body upstream of the opening and removably associated with the cup-shaped body; and a seal placed between one edge of the filtering wall and the cup-shaped body, characterised in that said seal is on said bottom wall and comprises a dispensing hole for dispensing a beverage at said opening, and
    wherein said seal further comprises a coupling member housed in the opening to reversibly fix said seal to said cup-shaped body.

2. The filter according to claim 1, characterised in that said seal is substantially bowl shaped.

3. The filter according to claim 1, characterised in that said seal has a shape complimentary to the shape of said cup-shaped body.

4. The filter according to claim 1, characterised in that said coupling member comprises a protrusion extending from the seal and passing through said opening.

5. The filter according to claim 4, characterised in that said coupling member further comprises an undercut portion arranged on the protrusion.

6. The filter according to claim 4, characterised in that said dispensing hole is fashioned along said protrusion.

7. The filter according to claim 1, characterised in that the seal is removably coupled to the filtering wall.

8. A filter for a coffee machine comprising a cup-shaped body for containing coffee powder, comprising at least a bottom wall comprising an opening; a filtering wall placed in the cup-shaped body upstream of the opening and removably associated with the cup-shaped body; and a seal placed between one edge of the filtering wall and the cup-shaped body, characterised in that said seal is on said bottom wall and comprises a dispensing hole for dispensing a beverage at said opening, and
    wherein an annular portion of the seal is secured by an interference coupling between an annular edge of the filtering wall and the cup-shaped body, and
    wherein said seal further comprises a coupling member housed in the opening to reversibly fix said seal to said cup-shaped body.

9. The filter according to claim 8, characterised in that said seal is substantially bowl shaped.

10. The filter according to claim 8, characterised in that said seal has a shape complimentary to the shape of said cup-shaped body.

11. The filter according to claim 8, characterised in that said coupling member comprises a protrusion extending from the seal and passing through said opening.

12. The filter according to claim 11, characterised in that said coupling member further comprises an undercut portion arranged on the protrusion.

13. The filter according to claim 11, characterised in that said dispensing hole is fashioned along said protrusion.

14. The filter according to claim 8, characterised in that the seal is removably coupled to the filtering wall.

* * * * *